(12) United States Patent
Brelivet et al.

(10) Patent No.: US 12,040,121 B2
(45) Date of Patent: Jul. 16, 2024

(54) ELECTRICAL TRANSFORMER AND METHOD OF MANUFACTURING AN ELECTRICAL TRANSFORMER

(71) Applicant: EnerSys Delaware Inc., Reading, PA (US)

(72) Inventors: Damien Brelivet, Arras (FR); Maxime Roudaut, Arras (FR); Patrick Dehem, Vitry en Artois (FR); Paul Antoine Gori, Arras (FR); David Letombe, Arras (FR)

(73) Assignee: EnerSys Delaware Inc., Reading, PA (US)

( * ) Notice: Subject to any disclaimer, the term of this patent is extended or adjusted under 35 U.S.C. 154(b) by 544 days.

(21) Appl. No.: 17/099,966

(22) Filed: Nov. 17, 2020

(65) Prior Publication Data

US 2021/0151244 A1 May 20, 2021

(30) Foreign Application Priority Data

Nov. 20, 2019 (EP) .................................... 19306491

(51) Int. Cl.
*H01F 27/28* (2006.01)
*H01F 27/30* (2006.01)
*H01F 30/06* (2006.01)

(52) U.S. Cl.
CPC ....... *H01F 27/2847* (2013.01); *H01F 27/306* (2013.01); *H01F 30/06* (2013.01)

(58) Field of Classification Search
CPC ..... H01F 27/2847; H01F 27/306; H01F 30/06
(Continued)

(56) References Cited

U.S. PATENT DOCUMENTS 8,310,327 B2 * 11/2012 Willers .................. H01F 27/06
336/200
10,742,123 B1 * 8/2020 Sigamani ................ H02M 3/01
(Continued)

FOREIGN PATENT DOCUMENTS

CN 101764421 A * 6/2010
CN 107464673 A * 12/2017 ......... H01F 27/2804
(Continued)

OTHER PUBLICATIONS

"Extended European Search Report corresponding to European Patent Application No. 19306491.2, mailed Mar. 24, 2020".
(Continued)

*Primary Examiner* — Shawki S Ismail
*Assistant Examiner* — Joselito S. Baisa
(74) *Attorney, Agent, or Firm* — Myers Bigel, P.A.

(57) ABSTRACT

An electrical transformer and method of manufacturing an electrical transformer. The electrical transformer comprises a set of primary windings comprising first and second primary windings connected in parallel and first and second sets of secondary windings. Each of the first and second sets comprises a plurality of secondary windings that are connected in parallel. The secondary windings of the first set are electrically isolated from the secondary windings of the second set. The set of primary windings and the first and second sets of secondary windings are arranged in a stacked structure in which the secondary windings of the first set are interleaved with the secondary windings of the second set, and at least one secondary winding of the first set and/or at least one secondary winding of the second set is arranged between the first and second primary windings.

17 Claims, 7 Drawing Sheets

(58) Field of Classification Search
 USPC .......................................................... 336/200
 See application file for complete search history.

(56) References Cited

U.S. PATENT DOCUMENTS

| | | | |
|---|---|---|---|
| 10,770,220 B2 * | 9/2020 | Vandeplassche | ... H01F 27/2852 |
| 2004/0174241 A1 | 9/2004 | He et al. | |
| 2007/0152795 A1 * | 7/2007 | Zeng | ................... H01F 27/2804 |
| | | | 336/212 |
| 2012/0306439 A1 | 12/2012 | Ichikawa et al. | |
| 2016/0225514 A1 * | 8/2016 | Cheng | ................... H01F 41/061 |
| 2017/0200552 A1 * | 7/2017 | Chung | ................ H01F 27/2885 |
| 2018/0082777 A1 | 3/2018 | Vandeplassche et al. | |
| 2020/0251270 A1 * | 8/2020 | Jacobson | ................ H01F 38/00 |

FOREIGN PATENT DOCUMENTS

| | | | | |
|---|---|---|---|---|
| CN | 208570304 U * | 3/2019 | ......... | H01F 27/2804 |
| CN | 113889324 A * | 1/2022 | ............. | H01F 27/02 |
| DE | 102011016320 A1 * | 5/2012 | .......... | B60L 11/1868 |
| EP | 0715392 A1 | 6/1996 | | |
| EP | 1351264 A1 * | 10/2003 | ........... | H01F 38/085 |
| EP | 2242067 A1 * | 10/2010 | ........ | H01F 27/2804 |
| WO | WO-2015156689 A1 * | 10/2015 | ............. | H01F 38/14 |

OTHER PUBLICATIONS

"European Examination Report in Corresponding Patent Application No. 19306491.2, mailed Mar. 16, 2023, 7 pages".

* cited by examiner

ELECTRICAL TRANSFORMER AND METHOD OF MANUFACTURING AN ELECTRICAL TRANSFORMER

CROSS-REFERENCE TO RELATED APPLICATION

The present application claims the benefit of priority under 35 U.S.C. § 119 to European Patent Application No. 19306491.2, filed on Nov. 20, 2019, the contents of which are incorporated by reference in their entireties for all purposes.

TECHNICAL FIELD

The present disclosure relates to an electrical transformer. Particularly, but not exclusively, the present disclosure relates to an electrical transformer for use in wireless power transfer systems. The present disclosure also relates to methods of manufacturing an electrical transformer.

BACKGROUND

Wireless power transfer (WPT) relates to the wireless transmission of electrical energy from a primary (transmitting) side to a secondary (receiving) side. Energy may be transferred via electromagnetic induction from the primary side to the secondary side. The primary side may be situated in a charging station, for example, and the secondary side may be electrically coupled to a chargeable battery. Wireless charging may be used in many applications, such as the charging of electrically powered vehicles. For example, a forklift truck may have an on-board battery pack which may be charged wirelessly when the forklift truck is positioned sufficiently close to a charging station for near-field, or inductive, coupling to occur.

Some WPT systems have comparable input and output voltages. However, some applications may require significant differentials between input and output voltages. For example, a battery of an electrically powered vehicle may operate at a relatively low voltage (e.g. 36 volts), whereas the charging station may be powered at a much higher voltage (e.g. 600 volts). Therefore, such WPT systems may be required to step-down the operating voltage. Further, such a voltage difference may mean that substantial currents are involved for high power charges. For example, 115 amps may be needed for a 5 kilowatt charge of a 36 volt battery for a forklift truck. Handling such high currents may be difficult, particularly on the secondary side of the WPT system, since the secondary side may be included in a battery pack or other portable device. As the secondary side of the WPT system may be included in a battery pack, the size and/or weight of the secondary side may also be a particular concern. Moreover, the secondary side of the WPT system may have to withstand environmental factors, such as moisture, vibrations, heat, etc.

The present disclosure seeks to address the above-mentioned problems. Alternatively or additionally, the present disclosure seeks to provide improved electrical transformers.

SUMMARY

According to a first aspect, there is provided an electrical transformer, comprising: a set of primary windings comprising first and second primary windings connected in parallel; and first and second sets of secondary windings, each of the first and second sets comprising a plurality of secondary windings that are connected in parallel, the secondary windings of the first set being electrically isolated from the secondary windings of the second set, wherein the set of primary windings and the first and second sets of secondary windings are arranged in a stacked structure in which: the secondary windings of the first set are interleaved with the secondary windings of the second set, and at least one secondary winding of the first set and/or at least one secondary winding of the second set is arranged between the first and second primary windings.

According to a second aspect, there is provided a battery pack equipment for an electrically powered vehicle, the battery pack equipment comprising at least one rechargeable battery, the battery pack equipment comprising an electrical transformer according to the first aspect.

According to a third aspect, there is provided a method of manufacturing an electrical transformer, the method comprising: providing a set of stackable primary windings comprising first and second primary windings; providing a plurality of stackable secondary windings; grouping the plurality of secondary windings into a first set of secondary windings and a second set of secondary windings; stacking the set of primary windings and the first and second sets of secondary windings; connecting the first and second primary windings of the set of primary windings in parallel; connecting the secondary windings of the first set in parallel; and connecting the secondary windings of the second set in parallel, wherein the set of primary windings and the first and second sets of secondary windings are stacked such that: the secondary windings of the first set are interleaved with the secondary windings of the second set, and at least one secondary winding of the first set and/or at least one secondary winding of the second set is arranged between the first and second primary windings.

It should be appreciated that features described in relation to one aspect of the present disclosure may be incorporated into other aspects of the present disclosure. For example, a method aspect may incorporate any of the features described with reference to an apparatus aspect and vice versa.

BRIEF DESCRIPTION OF THE DRAWINGS

Embodiments of the present disclosure will now be described by way of example only with reference to the accompanying schematic drawings of which.

DETAILED DESCRIPTION

Figure 1:
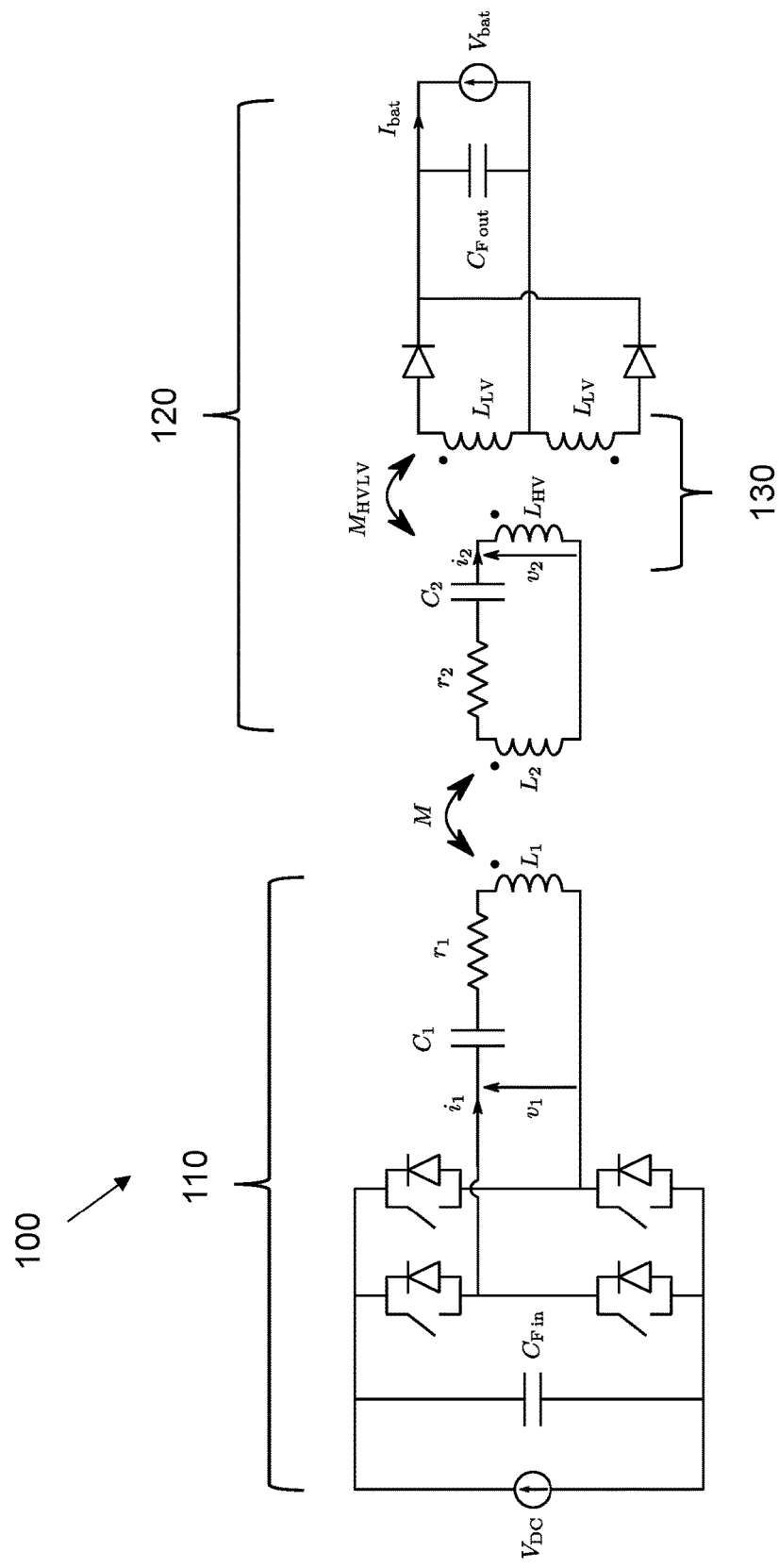
FIG. 1 shows a circuit diagram for a wireless power transfer system.

Referring to FIG. 1, there is shown an electrical circuit diagram 100 for a wireless power transfer (WPT) system. Such a WPT system may be used to wirelessly charge a battery pack. The WPT system may be suitable for charging the battery of an electrically powered vehicle, e.g. a forklift truck. In such an application, the secondary side 120 of the WPT system may be included in or coupled to a battery pack of the vehicle. The primary side 110 of the WPT system may be arranged at a charging station, for example.

The secondary side 120 of the WPT system is arranged to manage a reduction in operating voltage. This is because the secondary side 120 is arranged to receive a high voltage from the primary side 110 (e.g. up to 650 volts), and may need to charge a battery at a low voltage (e.g. at 24, 36 or 48 volts). Due to the substantial difference between these voltages, very high currents may be involved for high power charges. The secondary side 120 of the WPT system may include a High-Voltage Low-Voltage (HVLV) transformer 130, or alternatively a buck converter (also known as a step-down converter), to manage the voltage reduction. An HVLV transformer 130, for example in the form of a center-tap full-wave rectifier, may manage losses more effectively than a buck converter.

However, when some known transformers are used in the secondary side 120 of the WPT system, undesirable leakage inductance may occur. Such leakage inductance may primarily occur on the primary side of the transformer, but may additionally or alternatively occur on the secondary side of the transformer. Such leakage inductance can affect the voltage regulation sensitivity of the WPT system, and/or may cause or increase overvoltage ringing on diodes that are downstream of the transformer. Further, leakage inductance can reduce the coupling factor of the WPT system, thereby decreasing the charging efficiency of the WPT system, and/or potentially reducing the ability of the WPT system to effectively and efficiently charge a low voltage battery.

Embodiments of the present disclosure, provide an electrical transformer which has a reduced leakage inductance compared to known transformers. In particular, the transformer according to embodiments described herein comprises a stacked structure in which secondary windings of a first set of secondary windings are interleaved with secondary windings of a second set of secondary windings, and in which at least one secondary winding of the first set and/or at least one secondary winding of the second set is arranged between first and second primary windings. By arranging secondary windings between primary windings in the stacked structure, and by interleaving secondary windings from different sets (the secondary windings from different sets being electrically isolated from each other, and each set comprising secondary windings connected in parallel), leakage inductance in the transformer is reduced, thereby enabling an increase in the efficiency of the transformer, and consequently of the WPT system as a whole. By reducing the leakage inductance of the transformer, voltage regulation sensitivity and/or overvoltage ringing on downstream diodes may be reduced, and high currents may be managed effectively and efficiently. Further, such a stacked structure enables the transformer to be relatively flat, compact and structurally robust, and thereby particularly (though not exclusively) suitable for use on board an electrically powered vehicle, e.g. coupled to or within a battery pack for the vehicle.

Figure 2A:
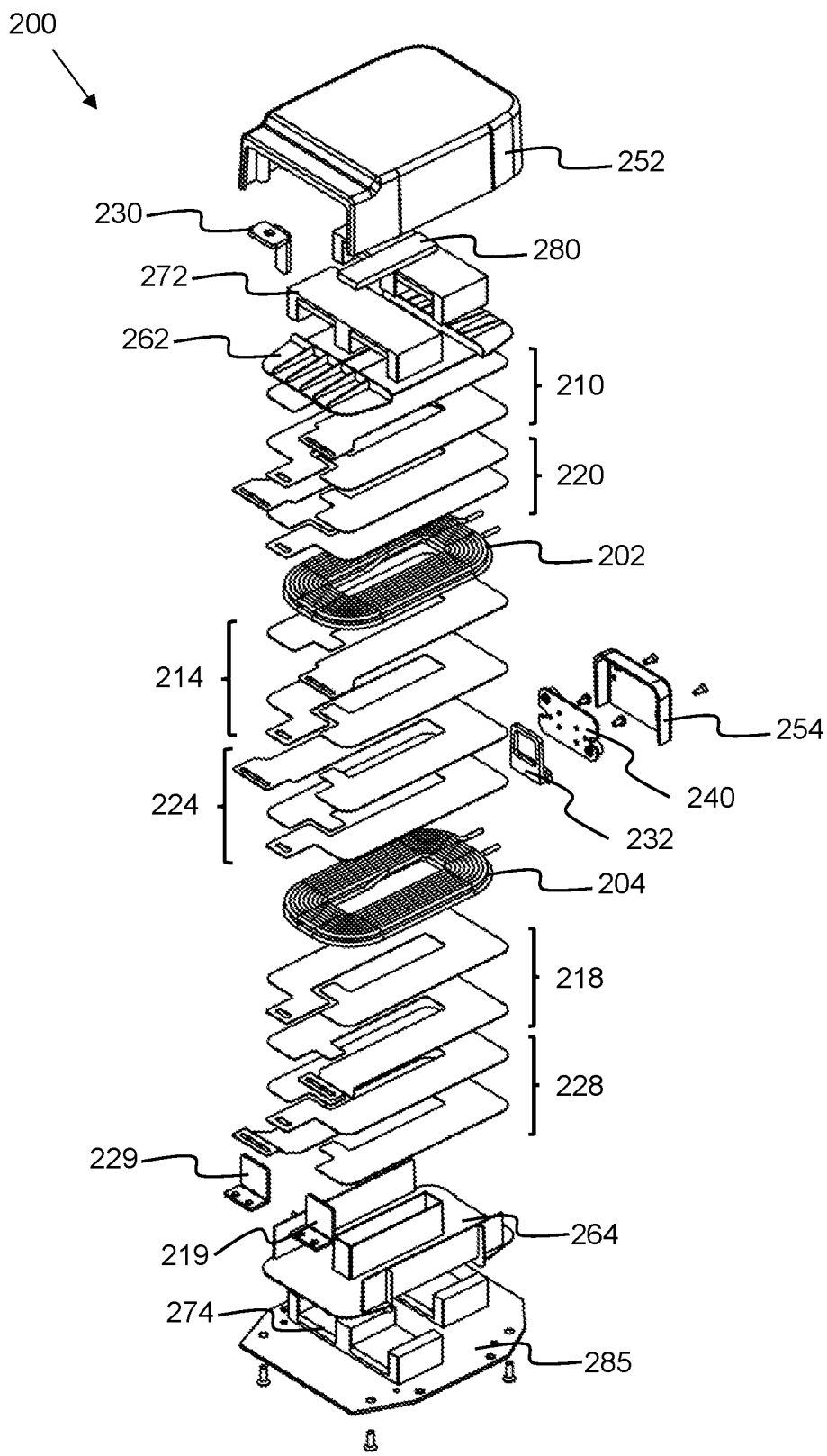
FIG. 2A shows an exploded view of an electrical transformer according to embodiments of the present disclosure.

Referring to FIG. 2A, there is shown an exploded view of an electrical transformer 200 according to embodiments of the present disclosure. The transformer 200 may be used on the secondary side of a WPT system, such as the WPT system described above with reference to FIG. 1. In embodiments, the transformer 200 can be used in a battery pack equipment for an electrically powered vehicle. Such a battery pack equipment may comprise at least one rechargeable battery. Such a battery pack equipment may be configured to be arranged within the electrically powered vehicle during charging of the battery, or may be configured to be arranged separately from the vehicle during charging of the battery. In embodiments, the transformer 200 comprises an HVLV transformer.

As shown in FIG. 2A, the transformer 200 comprises a stacked structure having a plurality of layers. Some or all of the layers may be substantially planar such that the layers can be stacked in a mechanically stable, spatially efficient and compact manner.

The transformer 200 comprises a first primary winding 202 and a second primary winding 204. The first primary winding 202 is connected to the second primary winding 204 in parallel. In this embodiment, each of the primary windings 202, 204 comprises one or more Litz wires. The use of Litz wires for the primary windings 202, 204 may reduce a skin effect compared to a case in which Litz wires are not used for one or both of the primary windings 202, 204. Further, Litz wires may be particularly suitable for potting, such that losses can be readily dissipated wherever the winding is within the transformer 200. In alternative embodiments, however, Litz wires are not used for one or both of the primary windings 202, 204.

In this embodiment, each of the primary windings 202, 204 comprise 18 turns. The 18 turns are obtained by providing 2 layers each having 9 turns. In alternative embodiments, each primary winding comprises a single layer. Different numbers of turns and/or layers may be used in alternative embodiments.

The transformer 200 also comprises a first set of secondary windings 210, 214, 218 and a second set of secondary windings 220, 224, 228. The first set comprises a plurality of secondary windings 210, 214, 218 that are connected in parallel. The second set comprises a plurality of secondary windings 220, 224, 228 that are connected in parallel. In this embodiment, the first set and the second set each comprise three secondary windings connected in parallel. Providing two sets of three parallel secondary windings may facilitate a reduction in leakage inductance (and consequently an increase in coupling factor), and/or a reduction in AC losses inside the windings, compared to a comparative case in which fewer secondary windings are used. The first set and/or the second set may comprise different numbers of secondary windings in alternative embodiments. In embodiments, the first set and the second set are non-overlapping. That is, the first and second sets do not have any windings in common. As such, the first and second sets may comprise discrete pluralities of secondary windings in parallel.

In embodiments, each of the secondary windings 210, 214, 218, 220, 224, 228 comprises one or more busbars. Busbars may be more robust than other forms of winding. In particular, busbars may be better suited to handle high currents (e.g. 115 amps) in the presence of non-trivial environmental conditions, such as vibrations and shocks, that may occur on-board an electrically powered vehicle. In this embodiment, each of the secondary windings comprises two turns. Each of the two turns comprises a busbar. In some examples, a single busbar encompasses more than one turn. Each of the secondary windings may comprise one or more layers in the stacked structure. In this embodiment, each of the secondary windings comprises two layers (e.g. corresponding to two busbars). Different numbers of turns and/or layers may be used in alternative embodiments. The number of turns per secondary winding and/or primary winding may be determined based on a desired performance characteristic of the transformer 200. Such a performance characteristic may comprise a desired voltage reduction, a desired charging power, a desired current-transfer capability, etc.

The secondary windings 210, 214, 218 of the first set are electrically isolated from the secondary windings 220, 224, 228 of the second set. In this embodiment, a polymer layer (not shown) is disposed on a surface of a secondary winding of the first set and/or of the second set. The polymer layer insulates the secondary windings from one another. That is, the polymer layer separates a given secondary winding from an adjacent secondary winding in the stack. In some examples, the primary windings are electrically isolated from the secondary windings. A similar polymer layer may be used for such electrical isolation. An example of such a polymer is polyimide, which may be applied as a film. In some embodiments, Kapton™ is used as the polymer layer. Polyimide film may be relatively thin and/or light compared to some other insulators (thereby allowing the transformer 200 to be relatively flat and compact). This can also facilitate a reduction in the separation between primary and secondary windings, which may therefore reduce leakage inductance and increase coupling. Additionally or alternatively, polyimide film may be stable over a wider range of temperatures compared to some other insulators. The secondary windings of the first set may be electrically isolated from the secondary windings of the second set in other ways (i.e. not using a polymer layer) in alternative embodiments, and similarly the primary windings may be electrically isolated from the secondary windings in other ways.

In embodiments, at least one secondary winding of the first set is connected in series with a secondary winding of the second set. In this embodiment, every secondary winding of the first set is connected in series with a respective secondary winding of the second set. Although the secondary windings of different sets may be connected in series, such connections are provided to enable a common output of the secondary windings, rather than for a current to flow from a secondary winding of the first set to a secondary winding of the second set, or vice-versa. Such connections may be made outside of the stacked structure (as described in more detail below). As such, the secondary windings from different sets may be electrically isolated from one another within the stacked structure, but may be connected (e.g. via common outputs) outside the stacked structure.

The secondary windings of the transformer 200 are stacked such that the secondary windings 210, 214, 218 of the first set are interleaved with the secondary windings 220, 224, 228 of the second set. This facilitates a reduction in leakage inductance compared to a case in which the secondary windings from different sets are not interleaved. In some embodiments, some of the secondary windings of the first set are interleaved with secondary windings of the second set, and some of the secondary windings of the first set are not interleaved with secondary windings of the second set.

At least one secondary winding of the first set and/or at least one secondary winding of the second set is arranged between the first and second primary windings 202, 204. This facilitates a reduction in leakage inductance compared to a case in which secondary windings are arranged on either side of primary windings but not between primary windings (or in which only one primary winding is used).

In embodiments, at least one secondary winding of the first set and at least one secondary winding of the second set are both arranged between the first and second primary windings. For example, in this embodiment, a secondary winding 214 of the first set and a secondary winding 224 of the second set are both arranged between the first and second primary windings 202, 204. Arranging a secondary winding from each set between the two primary windings may facilitate a further reduction in leakage inductance, and/or may increase the coupling efficiency of the transformer 200 by reducing an average distance between primary windings and secondary windings in the transformer 200. In some embodiments, more than one winding of the first set and/or more than one winding of the second set is arranged between the first and second primary windings 202, 204.

In embodiments, the first primary winding 202 is arranged between a first winding group and a second winding group, and the second primary winding 204 is arranged between the second winding group and a third winding group. Each of the first, second and third winding groups comprises one or more secondary windings of the first set and one or more secondary windings of the second set. In this embodiment, the first winding group comprises a secondary winding 210 of the first set and a secondary winding 220 of the second set, the second winding group comprises a secondary winding 214 of the first set and a secondary winding 224 of the second set, and the third winding group comprises a secondary winding 218 of the first set and a secondary winding 228 of the second set. Stacking the primary and secondary windings in such an order facilitates a reduction in primary leakage inductance.

In this embodiment, the first primary winding 202 is arranged between a secondary winding 220 of the second set and a secondary winding 214 of the first set, and the second primary winding 204 is arranged between a further secondary winding 224 of the second set and a further secondary winding 218 of the first set.

Figure 2B:
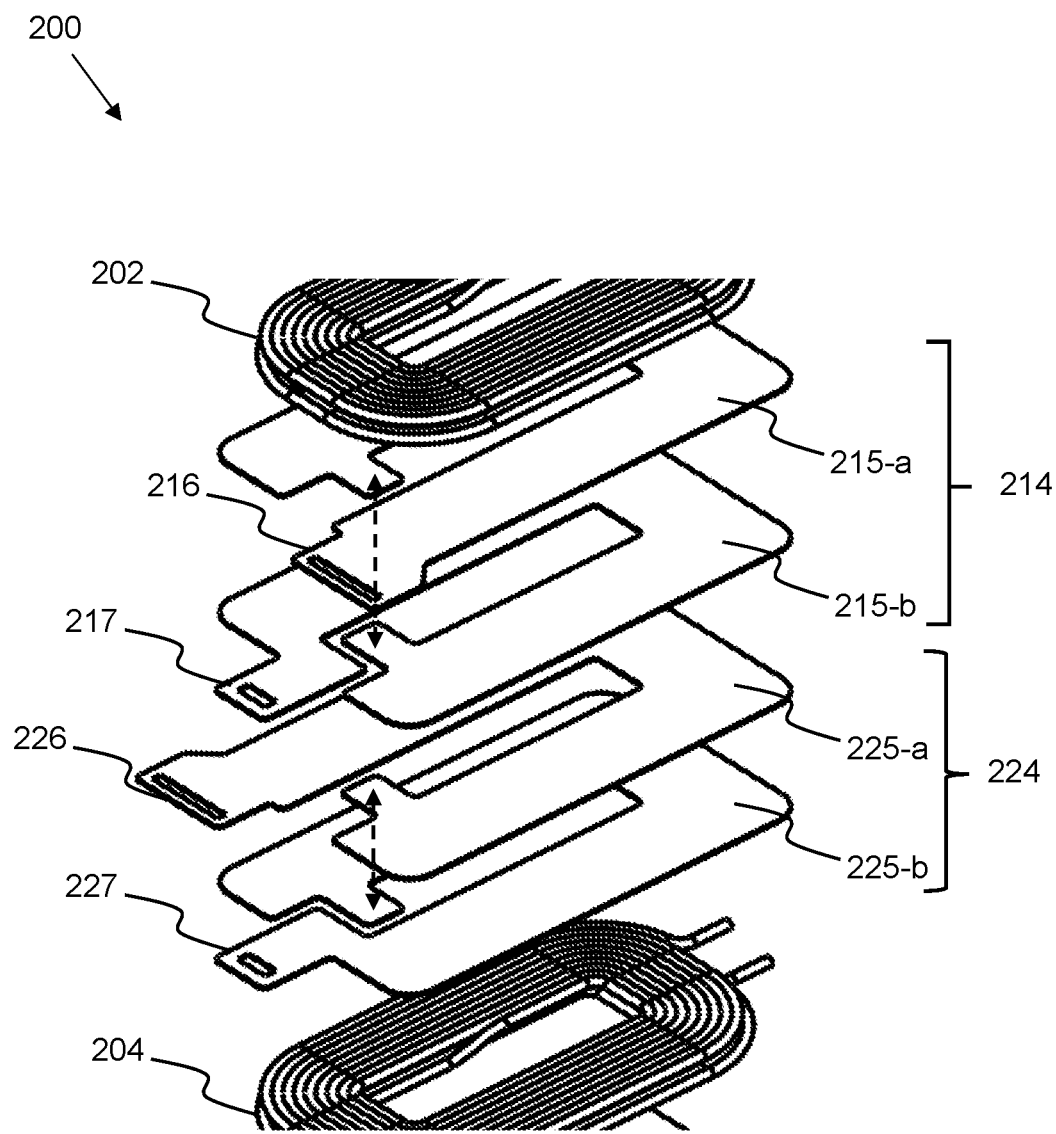
FIGS. 2B to 2D show different parts of the exploded view of the electrical transformer shown in FIG. 2A.

The secondary windings 214, 224 that are arranged between the primary windings 202, 204 are shown in greater detail in FIG. 2B. The secondary winding 214 comprises two busbars 215-a, 215-b, each of which encompasses one turn. The two busbars 215-a, 215-b are soldered together (as depicted by a dashed arrow in FIG. 2B) to form the secondary winding 214. The two busbars 215-a, 215-b may be connected together by other means in alternative embodiments. Similarly, the secondary winding 224 comprises two busbars 225-a, 225-b, each of which encompasses one turn, and which may be soldered together (as depicted by a dashed arrow in FIG. 2B) to form the secondary winding 224. The two busbars 225-a, 225-b may be connected together by other means in alternative embodiments.

The secondary winding 214 of the first set has a first output connector 216. The first output connector 216 is for connecting to a first transformer output 219 (as depicted in FIG. 2A). The first transformer output 219 may comprise a busbar, for example. The first transformer output 219 may act to connect the secondary windings 210, 214, 218 of the first set to one another. Further, the first transformer output 219 conveys an output from the secondary windings 210, 214, 218 of the first set. The secondary winding 224 of the second set has a second output connector 226. The second output connector 226 is for connecting a second transformer output 229. The second transformer output 229 is different to the first transformer output 219. The second transformer output 229 may comprise a busbar. The second transformer output 229 may act to connect the secondary windings 220, 224, 228 of the second set to one another. Further, the second transformer output 229 conveys an output from the secondary windings 220, 224, 228 of the second set.

Additionally, in this embodiment, the secondary winding 214 of the first set has a third output connector 217, and the secondary winding 224 of the second set also has a third output connector 227. The third output connectors 217, 227 are for connecting to a third transformer output. The third transformer output 230 is different to each of the first transformer output 219 and the second transformer output 229. In embodiments, the third transformer output 230 comprises a busbar. The third transformer output 230 may act as a common output channel connecting the secondary windings of the first and second sets, e.g. outside of the stacked structure. The third transformer output 230 may correspond to a center tap for the transformer 200. Providing the third transformer output 230 enables the average separation between primary windings and secondary windings in the transformer 200 to be reduced, thereby facilitating a decrease in leakage inductance and an increase in coupling efficiency. Further, providing a third transformer output 230 which is common to every secondary winding allows the overall transformer 200 to handle relatively high currents, as required in many WPT applications for charging low voltage batteries.

The use of busbars for the first, second and/or third transformer outputs 219, 229, 230 may provide for relatively simple, flexible and/or robust electrical connections between the various secondary windings. Further, the busbars may be readily adaptable for use with different downstream electrical connections. Moreover, busbars may be adapted to handle relatively high currents.

In embodiments, each of the output connectors 216, 217, 226, 227 comprises a slot configured to allow a busbar to pass through. This provides a structurally robust electrical connection between a given output connector and a corresponding transformer output. Some or all of the output connectors 216, 217, 226, 227 may take different forms in alternative embodiments.

Figure 2C:
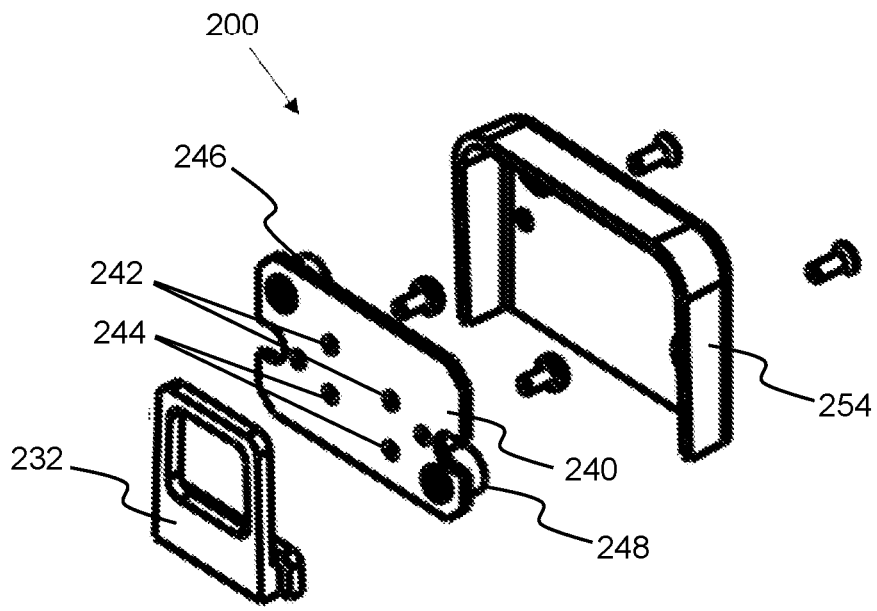

In embodiments, the transformer 200 comprises a printed circuit board (PCB) 240. This is shown in more detail in FIG. 2C. The PCB 240 is configured to interconnect the primary windings 202, 204. In this embodiment, the first primary winding 202 can be connected (e.g. via soldering) to the PCB 240 at first connection points 242. Similarly, the second primary winding 204 can be connected to the PCB 240 at second connection points 244. The PCB 240 also comprises a first primary power connection 246 for providing power to the first primary winding 202, and a second primary power connection 248 for providing power to the second primary winding 204. In alternative embodiments, a single power connection is provided for both the primary windings 202, 204.

In embodiments, the transformer 200 comprises casing structures 252, 254. The casing structures 252, 254 may be made from plastic or any other suitable material. The casing structures 252, 254 are configured to enclose and/or protect the internal components of the transformer 200. For example, the casing structures 252, 254 may be arranged to protect the internal components of the transformer 200 from environmental conditions, e.g. moisture. The casing structures 252, 254 may also provide impermeability to facilitate potting of some or all of the internal components of the transformer 200.

In embodiments, the transformer 200 comprises a PCB maintaining structure 232. The PCB maintaining structure 232 is configured to maintain the PCB 240 in the transformer 200. The PCB maintaining structure 232 may maintain the position of the PCB 240 in the transformer 200, and/or may maintain the functionality of the PCB 240. In embodiments, the PCB maintaining structure 232 is arranged to protect the PCB 240 and/or other components from environmental factors, e.g. moisture or other corrosive agents. The PCB maintaining structure 232 may be formed of rubber, or any other substantially impermeable and/or elastic material. The casing structure 254 depicted in FIG. 2C may be exposed to the environment of the transformer 200 in some embodiments (e.g. to allow the primary side of the transformer 200 to receive a power input). Therefore, the PCB maintaining structure 232 provides impermeability to protect the PCB 240 and/or the power connections 246, 248 from the environment.

In embodiments, the transformer 200 comprises ferrites 262, 264. The ferrites 262, 264 are arranged to transfer magnetic flux within the transformer 200. In this embodiment, the ferrites 262, 264 comprise ELP 102/20/38 ferrite core sets. Other types of ferrites and/or different numbers of ferrites may be used in other embodiments.

Figure 2D:
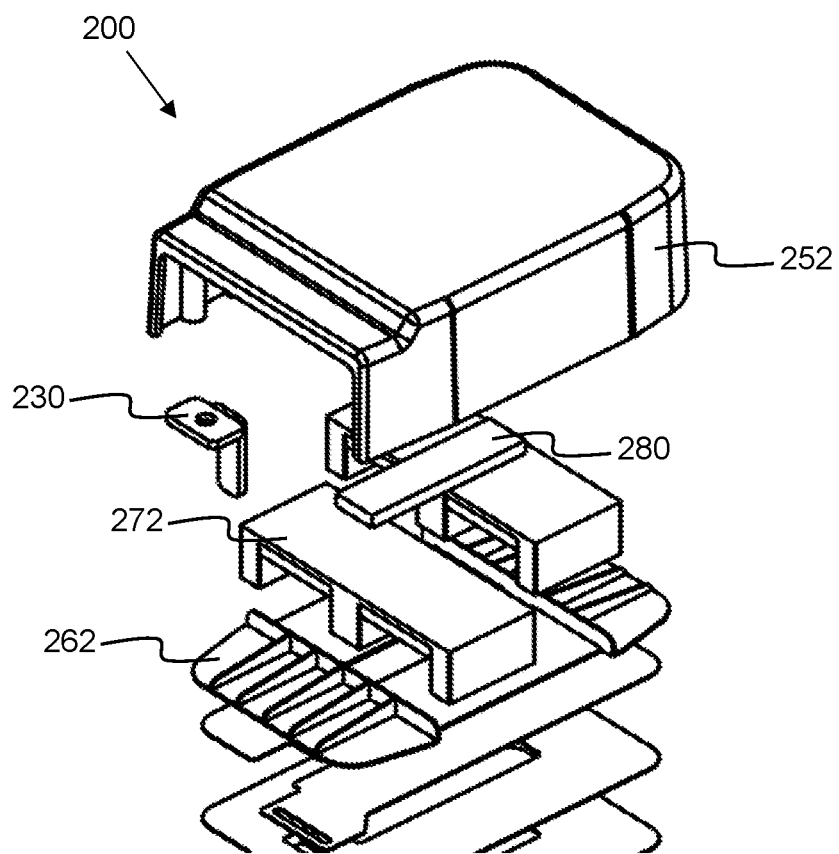

As shown in FIGS. 2A and 2D, the transformer 200 comprises one or more supporting structures 272, 274. The supporting structures 272, 274 are configured to encapsulate some or all of the internal components of the transformer 200. The supporting structures 272, 274 may be made from plastic or any other suitable material. The supporting structures 272, 274 may be configured to prevent the internal components of the transformer 200 from moving relative to one another, thereby providing a robust structure which is resilient to external vibrations, for example.

The transformer 200 also comprises a movement absorbing element 280, e.g. a sponge. The movement absorbing element 280 may be disposed on the supporting structure 272. The movement absorbing element 280 is arranged to absorb movement of the internal components of the transformer 200, e.g. the ferrites, primary windings, and secondary windings. As such, the movement absorbing element 280 may ensure that the positions of the internal components of the transformer 200 within the transformer 200 do not change. Therefore, the effects of possible vibration, shock or other movement may be mitigated. By ensuring the correct positioning of the internal components of the transformer 200, encapsulation of such internal components by the casing structures 252, 254 is facilitated. This can make manufacture of the transformer 200 more efficient.

In embodiments, a potting agent is applied within the transformer 200. An example of such a potting agent is resin, e.g. epoxy resin. Other solid or gelatinous materials may be used instead of resin in some cases, e.g. thermosetting plastic or silicon rubber gel. The potting agent facilitates the fixing of the relative positions of the internal components of the transformer 200. Further, the potting agent may facilitate thermal dissipation to the baseplate 285 of the transformer 200. Additionally or alternatively, the potting agent may protect the internal assembly of the transformer 200 from moisture and/or corrosive agents. The potting agent may be applied via the secondary side of the transformer, in some examples. In alternative embodiments, a potting agent is not applied within the transformer 200.

The transformer 200 may comprise more, fewer and/or different components in alternative embodiments.

Figure 3A:
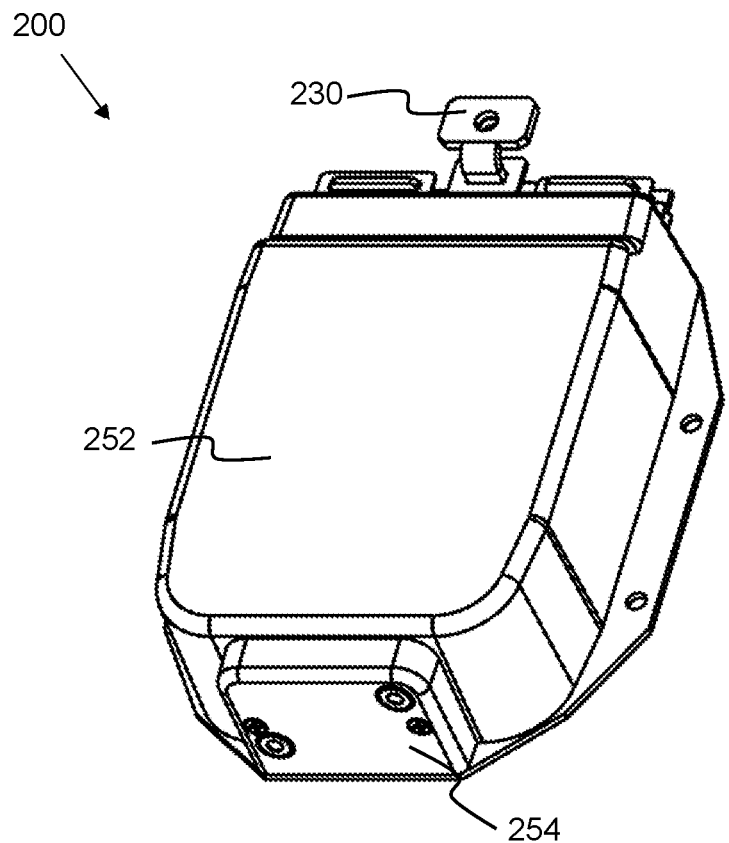
FIGS. 3A to 3C show an electrical transformer according to embodiments of the present disclosure.
Figure 3B:
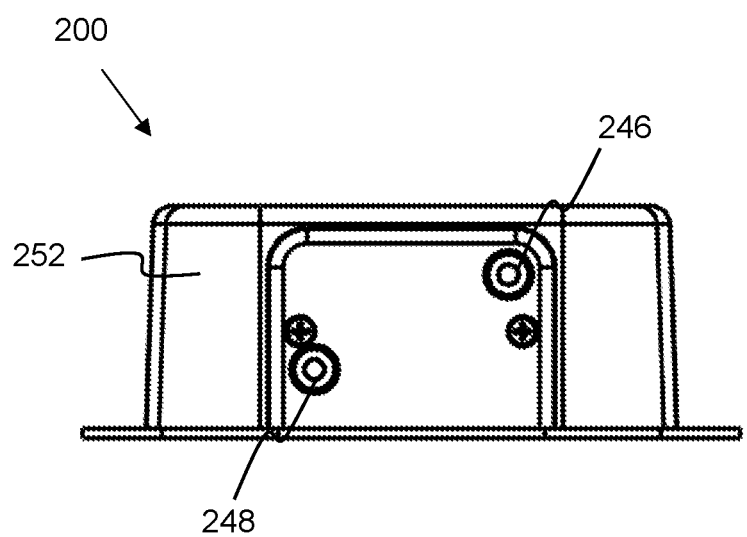
Figure 3C:
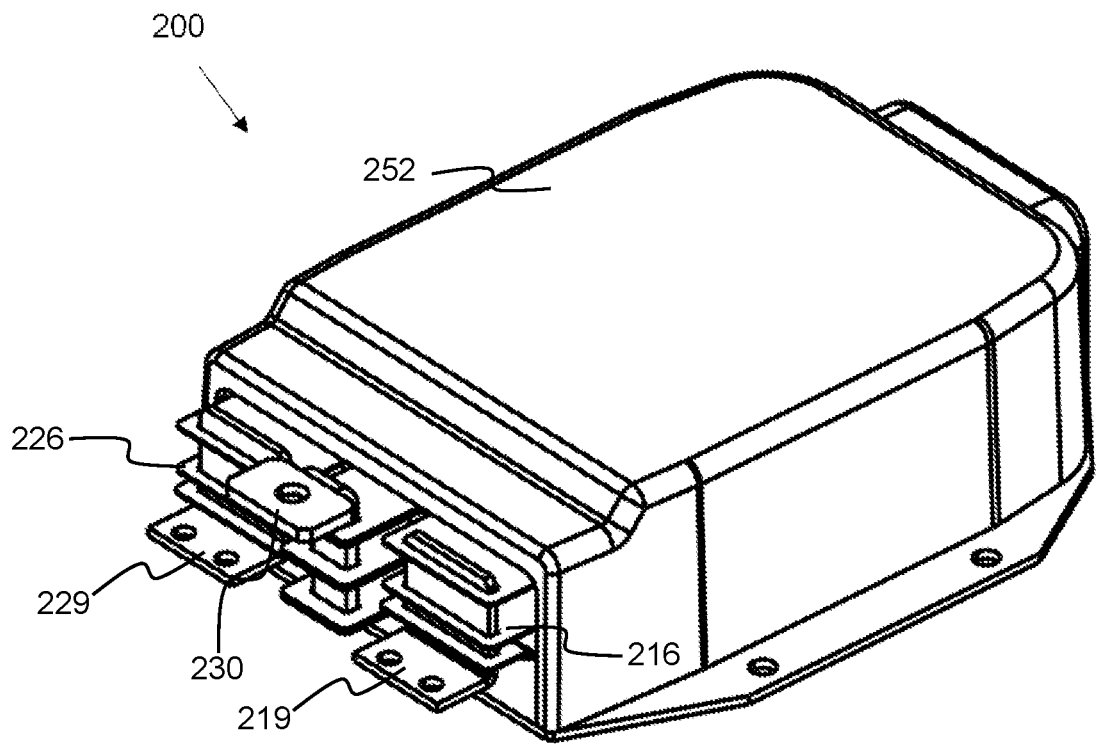

Referring to FIGS. 3A to 3C, there is shown the transformer 200 fully assembled, with the casing structures 252, 254 encapsulating the internal components of the transformer 200.

As shown in FIG. 3B, the first and second primary power connections 246, 248, for delivering power to the first and second primary windings 202, 204, respectively, are provided via respective holes in the casing structure 254.

As shown in FIG. 3C, the corresponding outputs of the secondary windings are connected via busbars. In this embodiment, such connections are provided outside of the stacked structure. Some or all of such connections may alternatively be provided within the transformer 200.

In this embodiment, each secondary winding 210, 214, 218 of the first set has a first output connector for connecting to a first transformer output 219. The first transformer output 219 connects the first output connectors for each of the secondary windings 210, 214, 218 of the first set. Similarly, each secondary winding 220, 224, 228 of the second set has a second output connector for connecting to a second transformer output 229. The second transformer output 229 connects the second output connectors for each of the secondary windings 220, 224, 228 of the second set.

In embodiments, the first transformer output 219 and/or the second transformer output 229 is adapted for use with diode circuitry, e.g. an isotop diode package. This can enable the transformer 200 to be used on the secondary side of a WPT system, such as that depicted in FIG. 1 (e.g. with a diode package arranged downstream of the transformer 200). The first transformer output 219 and/or the second transformer output 229 may take other forms in alternative embodiments, and/or may be useable with different types of downstream components.

In this embodiment, each of the secondary windings of both the first and second sets has a third output connector for connecting to a third transformer output 230. The third transformer output 230 is thus a common output for all of the secondary windings of both sets. The third transformer output 230 comprises a busbar in this embodiment. The third transformer output 230 may also be adapted for use with particular downstream circuitry. The third transformer output 230 may take other forms in alternative embodiments.

Figure 4:
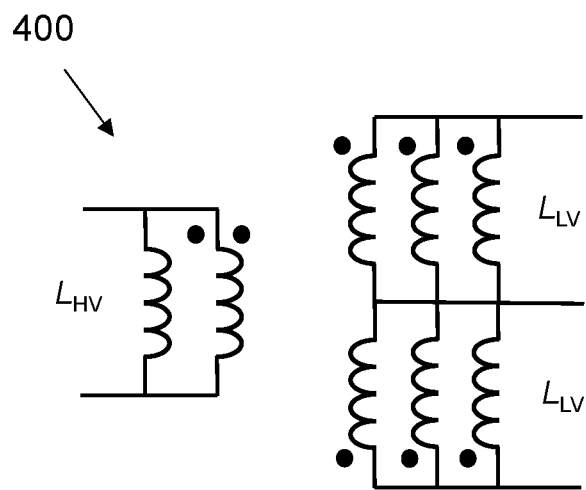
FIG. 4 shows a circuit diagram for an electrical transformer according to embodiments of the present disclosure.

Referring to FIG. 4, there is shown an electrical circuit diagram 400 for the transformer 200, according to embodiments of the present disclosure. As shown in the circuit diagram 400, the primary side of the transformer 200 comprises two primary windings arranged in parallel, and the secondary side of the transformer 200 comprises two sets of three secondary windings, the secondary windings of each set being arranged in parallel. Each of the six secondary windings has two output connections. One output connection connects the secondary windings of a given set (e.g. along the top or bottom of the secondary side of FIG. 4). The other output connection connects all six secondary windings (e.g. along the center of the secondary side of FIG. 4).

Figure 5:
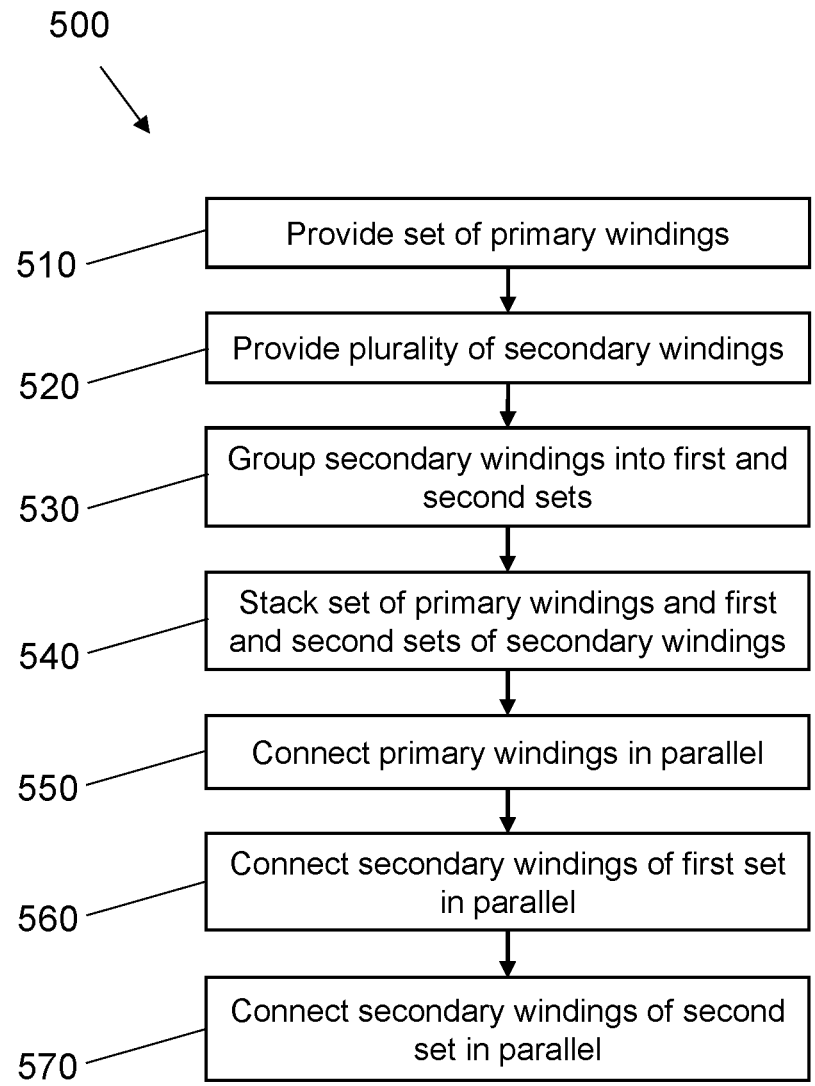
FIG. 5 shows a flow diagram depicting a method of manufacturing an electrical transformer according to embodiments of the present disclosure.

Referring to FIG. 5, there is shown a method 500 of manufacturing an electrical transformer according to embodiments of the present disclosure. The method 500 may be used to manufacture the electrical transformer 200 described above.

At item 510, a set of stackable primary windings is provided. The set of primary windings comprises first and second primary windings. The primary windings may be substantially planar, and therefore readily stackable.

At item 520, a plurality of stackable secondary windings is provided. The secondary windings may be substantially planar, and therefore readily stackable.

At item 530, the plurality of secondary windings is grouped into a first set of secondary windings and a second set of secondary windings.

At item 540, the set of primary windings and the first and second sets of secondary windings are stacked. The windings are stacked so as to form a stacked structure. Such a stacked structure may be relatively compact and/or mechanically robust compared to a non-stacked structure.

The set of primary windings and the first and second sets of secondary windings are stacked such that the secondary windings of the first set are interleaved with the secondary windings of the second set. Further, the primary and secondary windings are stacked such that at least one secondary winding of the first set and/or at least one secondary winding of the second set is arranged between the first and second primary windings. Therefore, leakage inductance in the transformer may be reduced.

At item 550, the first and second primary windings of the first set of primary windings are connected in parallel. The primary windings may be interconnected via a PCB, for example.

At item 560, the secondary windings of the first set are connected in parallel. The secondary windings of the first set may be connected via a first busbar, for example.

At item 570, the secondary windings of the second set are connected in parallel. The secondary windings of the second set may be connected via a second busbar, for example.

By providing a plurality of stackable secondary windings (e.g. in the form of busbars), a given secondary winding may be readily interchanged with another secondary winding in the stack before the inter-connections are made. That is, each secondary winding may be constructed separately (according to a standard specification), before being stacked in a particular order, thereby making the manufacturing process more efficient. Further, individual secondary windings may be readily added or removed from the stack as desired, e.g. to modify the current-carrying capabilities and/or the physical dimensions of the transformer.

The steps of the method 500 may be performed in a different order in alternative embodiments. For example, one or more of the connecting steps 550, 560, 570 may be performed prior to the stacking step 540 in some cases.

Whilst the present disclosure has been described and illustrated with reference to particular embodiments, it will be appreciated by those of ordinary skill in the art that the present disclosure lends itself to many different variations not specifically illustrated herein. By way of example only, certain possible variations will now be described.

In embodiments of the present disclosure, the electrical transformer 200 is for use in a wireless power transfer system. In alternative embodiments, the electrical transformer 200 is for use in other applications. The electrical transformer 200 may be used in any application which requires a relatively high current to be managed.

In some embodiments, the electrical transformer 200 is for use in a forklift truck. In alternative embodiments, the electrical transformer 200 is for use in different types of vehicle. For example, the electrical transformer 200 may be used in electrically powered cars, buses, scooters, aircraft, marine vehicles, etc.

In embodiments, each of the primary windings 202, 204 comprises one or more Litz wires. In alternative embodiments, one or more of the primary windings 202, 204 comprise one or more of a PCB, busbar, flexible busbar, etc.

In embodiments, each of the secondary windings comprises one or more busbars. In alternative embodiments, one or more of the secondary windings comprise one or more of a PCB, Litz wire, flexible busbar, etc.

In embodiments, the transformer 200 comprises an HVLV transformer. In alternative embodiments, the transformer 200 comprises a Low-Voltage High-Voltage (LVHV), or 'step-up', transformer.

In embodiments, at least one secondary winding of the first set is connected in series with a secondary winding of the second set. In alternative embodiments, the secondary windings of the first set are not connected in series with secondary windings of the second set.

In embodiments, the transformer comprises two primary windings connected in parallel. In alternative embodiments, the transformer comprises more than two primary windings.

In embodiments, the transformer comprises two sets of secondary windings, each set comprising a plurality of secondary windings connected in parallel. In alternative embodiments, the transformer comprises more than two sets of secondary windings, each set comprising a plurality of secondary windings connected in parallel.

In embodiments, each secondary winding comprises two turns. In alternative embodiments, one or more of the secondary windings comprises a different number of turns. Different secondary windings may have different numbers of turns from one another in some embodiments.

In embodiments, each primary winding comprises 18 turns. In alternative embodiments, one or more of the primary windings comprises a different number of turns. Different primary windings may have different numbers of turns from one another in some embodiments.

In embodiments, each secondary winding of both the first and the second set has an output connection to a common transformer output. In alternative embodiments, the secondary windings of different sets do not have output connections to a common transformer output.

Where in the foregoing description, integers or elements are mentioned which have known, obvious or foreseeable equivalents, then such equivalents are herein incorporated as if individually set forth. It will also be appreciated that integers or features of the present disclosure that are described as preferable, advantageous, convenient or the like are optional and do not limit the scope of the independent claims. Moreover, it is to be understood that such optional integers or features, whilst of possible benefit in some embodiments, may not be desirable, and may therefore be absent, in other embodiments.

The features of any dependent claim may be combined with the features of any of the independent claims or other dependent claims. Features described in relation to one example or embodiment may be used in other described examples or embodiments, e.g. by applying relevant portions of that disclosure.

The invention claimed is:

1. An electrical transformer, comprising:
   a set of primary windings comprising first and second primary windings connected in parallel; and
   first and second sets of secondary windings, each of the first and second sets comprising a plurality of secondary windings that are connected in parallel, the secondary windings of the first set being electrically isolated from the secondary windings of the second set,
   wherein the set of primary windings and the first and second sets of secondary windings are arranged in a stacked structure in which:
   the secondary windings of the first set alternate with and are interleaved with the secondary windings of the second set, and
   at least one secondary winding of the first set and/or at least one secondary winding of the second set is arranged between the first and second primary windings.

2. The electrical transformer according to claim 1, wherein the at least one secondary winding of the first set and the at least one secondary winding of the second set are both arranged between the first and second primary windings.

3. The electrical transformer according to claim 1, wherein at least one secondary winding of the first set is connected in series with a secondary winding of the second set.

4. The electrical transformer according to claim 1, wherein every secondary winding of the first set is connected in series with a respective secondary winding of the second set.

5. The electrical transformer according to claim 1, wherein the first set and the second set each comprise three secondary windings that are connected in parallel.

6. The electrical transformer according to claim 1, wherein the first primary winding is arranged between a first winding group and a second winding group, and the second primary winding is arranged between the second winding group and a third winding group, each of the first, second and third winding groups comprising one or more secondary windings of the first set and one or more secondary windings of the second set.

7. The electrical transformer according to claim 1, wherein each of the secondary windings of the first and second sets comprises 2 turns.

8. The electrical transformer according to claim 1, wherein each of the secondary windings of the first and second sets comprises at least one busbar.

9. The electrical transformer according to claim 1, wherein each of the first and second primary windings comprises 18 turns.

10. The electrical transformer according to claim 1, wherein each of the first and second primary windings comprises at least one Litz wire.

11. The electrical transformer according to claim 1,
   wherein each secondary winding of the first set has a first output connector for connecting to a first transformer output,
   wherein each secondary winding of the second set has a second output connector for connecting to a second transformer output, different to the first transformer output, and
   wherein each secondary winding of the first and second sets has a third output connector for connecting to a third transformer output, the third transformer output being different to each of the first transformer output and the second transformer output.

12. The electrical transformer according to claim 11, wherein each of the first transformer output, second transformer output and third transformer output comprises a busbar.

13. The electrical transformer according to claim 1, comprising a polymer layer disposed on a surface of a secondary winding of the first set and/or of the second set.

14. A battery pack equipment for an electrically powered vehicle, the battery pack equipment comprising at least one rechargeable battery and the electrical transformer according to claim 1.

15. The electrical transformer according to claim 1, wherein each of the secondary windings of the first and second sets comprises at least two busbars.

16. A method of manufacturing an electrical transformer, the method comprising:
   providing a set of stackable primary windings comprising first and second primary windings;
   providing a plurality of stackable secondary windings;
   grouping the plurality of secondary windings into a first set of secondary windings and a second set of secondary windings;

stacking the set of primary windings and the first and second sets of secondary windings;

connecting the first and second primary windings of the set of primary windings in parallel;

connecting the secondary windings of the first set in parallel; and connecting the secondary windings of the second set in parallel, wherein the set of primary windings and the first and second sets of secondary windings are stacked such that:

the secondary windings of the first set alternate with and are interleaved with the secondary windings of the second set, and at least one secondary winding of the first set and/or at least one secondary winding of the second set is arranged between the first and second primary windings.

17. A wireless power transfer (WPT) system comprising a primary side and a secondary side, the secondary side of the WPT system comprising an electrical transformer, the electrical transformer comprising:

a set of primary windings comprising first and second primary windings connected in parallel; and first and second sets of secondary windings, each of the first and second sets comprising a plurality of secondary windings that are connected in parallel, the secondary windings of the first set being electrically isolated from the secondary windings of the second set, wherein the set of primary windings and the first and second sets of secondary windings are arranged in a stacked structure in which:

the secondary windings of the first set alternate with and are interleaved with the secondary windings of the second set, and at least one secondary winding of the first set and/or at least one secondary winding of the second set is arranged between the first and second primary windings.

* * * * *